United States Patent [19]

Amtmann et al.

[11] 4,027,080
[45] May 31, 1977

[54] CROSSLINKING OF POLYOLEFINES

[75] Inventors: Rudolf Amtmann, Munich; Hans Seidl, Grunwald; Hansjoachim Twittenhoff, Strasslach, all of Germany

[73] Assignee: Peroxid-Chemie GmbH, Hollriegelskreuth, near Munich, Germany

[22] Filed: Sept. 22, 1976

[21] Appl. No.: 725,370

[30] Foreign Application Priority Data

Oct. 13, 1975  Germany .......................... 2545789

[52] U.S. Cl. ................................. 526/12; 526/54; 526/55; 528/481; 528/503
[51] Int. Cl.² ..................... C08F 8/00; C08K 5/01; C08T 3/24
[58] Field of Search ...................... 526/12, 55, 54; 528/481, 503

[56]  References Cited

UNITED STATES PATENTS 3,651,011  3/1972  Schaffhauser et al. .............. 526/12

FOREIGN PATENTS OR APPLICATIONS 395,766  11/1961  Japan ................................. 526/12
1,118,597  11/1965  United Kingdom ................. 526/12

Primary Examiner—William F. Hamrock
Attorney, Agent, or Firm—Hans Berman

[57]  ABSTRACT

Polyolefines are crosslinked in the presence of a crosslinking agent having the formula

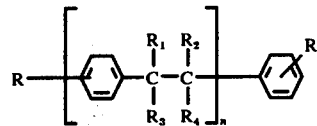

wherein each R is selected from the group consisting of hydrogen, an alkyl group having from 1 to 6 C-atoms and an alkoxy group having 1 or 2 C-atoms, and $R_1$, $R_2$, $R_3$ and $R_4$ each is selected from the group consisting of hydrogen and an alkyl group having from 1 to 6 C-atoms, at least two of $R_1$, $R_2$, $R_3$ and $R_4$ being an alkyl group, and $n$ is an integer from 1 to 5.

10 Claims, No Drawings

CROSSLINKING OF POLYOLEFINES

The present invention relates to the crosslinking of polyolefines to obtain reticulated olefine polymers, and more particularly to improve crosslinking agents used.

As is well known, polyolefines are very useful thermoplastic synthetic resins soluble in organic solvents. It is known that the solubility and plasticity of these polymers when subjected to heat may be reduced and the polymers will have an improved temperature resistance, chemical and form stability, and reduced tendency to tear if they are crosslinked.

Two technically different methods have been used for the crosslinking of polyolefines, i.e. physical reticulation by subjecting the polyolefines to energy-rich radiation or chemical crosslinking by adding to the polyolefines a crosslinking agent, such as an organic peroxide. While crosslinking with organic peroxides produces reticulated polyolefines, these crosslinking agents have many disadvantages.

A crosslinking agent will be fully effective only if it is thoroughly and homogeneously dispersed throughout the polymer. At the relatively high mixing temperatures required, many organic peroxides become thermally unstable and benzoyl peroxide even tends to decompose explosively at such temperatures, which makes a homogeneous dispersion of the crosslinking agent in the polymer impossible, thus preventing homogenous reticulation. Other organic peroxides decompose rapidly at the softening point of the polymers so that they tend to crosslink the polymers so rapidly that the further working of the polymer becomes difficult or impossible. For instance, extrusion of the reticulated polymer often becomes difficult or impossible because the viscosity increases undesirably during the softening of the polymer, causing a corresponding increase in the power requirements, with attendant increases in the wear of the extruder and energy costs, if it does not completely block the machine. Best results have been obtained with dialkyl and diaralkyl peroxides, for instance di-tertiarybutyl peroxide (DTBP) and dicumylperoxide (DCP), which have been preferred crosslinking agents for polyolefines. DTBP effectively crosslinks polyolefines but is so volatile that its use is limited. DCP can be used under normal operating conditions only at the cost of considerable environmental pollution since its principal decomposition product is acetophenone which imparts to the finished product and to the environment a very intensive unpleasant odor.

No crosslinking agents for polyolefines have been proposed which may be readily incorporated into the polymer before it is shaped and do not cause a degree of reticulation hindering the further working of the polymer at the temperatures required to heat the polymer above the softening point and thus to make mixing and shaping possible but produce such crosslinking only at higher temperatures. This is particularly true for high-density polyethylenes which have a melting point of 127° C and above, and which are subjected to temperatures of 150° to 240° C, or even as high as 320° C, while being worked before or during shaping.

The described disadvantages of peroxide crosslinking agents are due to their chemical structure. Compounds of different chemical structures without peroxide groups are also known which dissociate to give free radicals by splitting along the carbon-to-carbon bonds. The formation of free radicals is normally limited to compounds wherein the normally stable C—C bond is weakened by suitable neighboring substituents. Free radicals formed in this manner are usually aryl-substituted radicals. Although such radicals have been used as polymerization initiators for unsaturated compounds containing ethylenic linkages (see U.S. Pat. No. 3,066,115), they are not generally used to start radical reactions since they have been described as chain-breaking reagents or as flameproofing agents, for instance, in British Pat. No. 1,221,822 and German Pat. Nos. 1,270,803 and 1,272,533.

It is the primary object of this invention to overcome the disadvantages outlined hereinabove and to crosslink polyolefines with a class of phenyl-substituted alkanes free of the shortcomings of prior art crosslinking agents.

The above and other objects are accomplished in accordance with the invention by crosslinking a polyolefine in the presence of a crosslinking agent having the formula

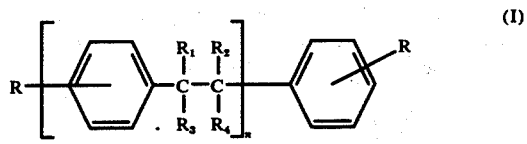

wherein each R is selected from the group consisting of hydrogen, an alkyl group having from 1 to 6 C-atoms and an alkoxy group having 1 or 2 C-atoms, and $R_1$, $R_2$, $R_3$ and $R_4$ each is selected from the group consisting of hydrogen and an alkyl group having from 1 to 6 C-atoms, at least two of $R_1$, $R_2$, $R_3$ and $R_4$ being an alkyl group, and $n$ is an integer from 1 to 5.

It has been found unexpectedly that these compounds have the ability to cause crosslinking of polyolefines. Therefore, compounds of formula (I) are useful for the reticulation of polyolefines, these compounds being substantially free of the disadvantages of prior art crosslinking agents for polyolefines or at least displaying these disadvantages to a reduced extent. These compounds are capable of splitting the central C—C bond in a temperature range of about 170° to about 400° C. The half-life values of these compounds in the temperature range preferred for crosslinking, i.e. about 170° to 300° C, is between 10 hours and six minutes. Because of their long half-lives at the lower range of the operating temperature range, i.e. about 180° C, they can be well worked into the polymer without noticeable decomposition and corresponding initiation of crosslinking of the polymer. The compounds become markedly more active at temperatures above 190° C but even at such and higher temperatures (as illustrated by Example 2), thorough mixing into the polymer proceeds well without noticeable crosslinking, as reflected by an increase in the resistance to kneading. This makes these compounds very attractive as crosslinking agents for polyolefines.

Typical examples of compounds of the formula (I) for crosslinking polyolefines include 2,3-dimethyl-2,3-diphenylbutane, 2,3-dipropyl-2,3-diphenylbutane, 2,3-dibutyl-2,3-diphenylbutane, 2,3-dihexyl-2,3-diphenylbutane, 2-methyl-3-ethyl-2,3-diphenylbutane, 2-methyl-2,3-diphenylbutane, 2,3-diphenylbutane, 2,3-dimethyl-2,3-di-(p-methoxyphenyl)-butane, 2,3-dimethyl-2,3-di-(p-methylphenyl)-butane, 2,3-dimethyl-2-methylphenyl-3-[(p-2'3'-dimethyl-3'-methylphenyl-butyl)-phenyl]-butane, 3,4-dimethyl-3,4-diphenylhexane, 3,4-diethyl-3,4-diphenylhexane, 3,4-dipropyl-3,4-diphenylhexane, 4,5-dipropyl-4,5-diphenyloctane, 2,3-diisobutyl-2,3-diphenylbutane, 3,4-diisobutyl-3,4-diphenylhexane, 2,3-dimethyl-2,3-di[p(t-butyl)-phenyl]-butane,5,6-dimethyl-5,6diphenyldecane, 6,7-diphenyldodecane, 7,8-dimethyl-7,8-di(methoxyphenyl)-tetra-decane, and the like. Preferred are compounds of the formula (I) wherein all of $R_1$ to $R_4$ are alkyl groups. The preferred alkyl groups are methyl, ethyl, isobutyl and tertiary butyl.

Examples of polyolefines which may be crosslinked by the compounds of formula (I) include homopolymers and copolymers of ethylene, propylene and butylene, such as polyethylene, ethylene-propylene copolymers, polybutylene, and the like. Preferably, the compounds of formula (I) are used for crosslinking such olefine polymers which no longer contain unsaturated groups.

Crosslinking of the polyolefines in the presence of a compound of formula (I) is effected by mixing the polyolefine with the compound, usually by kneading the compound into the polymer in a temperature range above the softening point of the polymer, and then raising the temperature into the operating range indicated hereinabove.

The amount of the crosslinking agent used and the temperatures at which crosslinking proceeds depend on the specific compound of the formula (I) used on the composition of the polymer, particularly the type of softening agents and/or other additives present therein. Routine experimentation well within the skill of a laboratory assistant will show the most favorable temperature range, dwell time and amounts to be used for each specific polymer composition and crosslinking compound. Generally, about 0.1% to 5%, by weight, based on the weight of the polyolefine, of the crosslinking agent will be used. In some instances, smaller amounts will suffice or larger amounts will be more effective.

The outstanding advantage of using compounds of the formula (I) for crosslinking polyolefines resides in the fact that no premature reticulation of the polymer occurs just above its softening point. Therefore, these compounds may be incorporated and homogeneously dispersed in the polymer in a temperature range far above the softening point of the polymer, which was heretofore impossible, which makes it feasible to work the polymer in conventional extruders and the like at conventional working temperatures without the danger of premature crosslinking interfering with the mixing and subsequent shaping steps.

Another advantage of using the compounds of formula (I) as crosslinking agents for polyolefines resides in the fact that these compounds, contrary to conventional crosslinking agents, are pure hydrocarbons and thus belong to the same chemical class of compounds as the polymers to be crosslinked, thus being fully compatible with the polymers and capable of being added to the polymer even during its preparation. Furthermore and also contrary to conventional polyolefine crosslinking agents, compounds of formula (I) are not very volatile and are odorless. They are easy to handle and cause no storage problems in handwritting.

In the following examples, which illustrate the practice of the present invention, crosslinking was effected in a Brabender plastograph whose operation is described in detail in German Auslegeschrift (published accepted application) No. 1,189,710, col. 4, lines 45 et seq., whose disclosure is incorporated herein by reference. All tests were carried out in the same measuring range of instrument PL-3 S at 1:2.5 with the balance × 5. In the selected measuring range, 400 plastograph units mean 1 mkp. The kneader was rotated at 80 rpm. All percentages are by weight. The charge in the kneading chamber was 55 grams of polyolefine in each test.

The limiting temperature for working in the compound of formula (I) without crosslinking was the scorch temperature, TS, which is defined as the temperature at which, within 10 minutes of incorporation of the compound in the polymer, a first weak increase of the resistance to kneading is recorded.

The measurement for the crosslinking efficiency, F, is expressed by the quotient $$F = \gamma max / \gamma_o$$

wherein $\gamma max$ constitutes the resistance of the crosslinked polymer to kneading before any thermal decomposition takes place and $\gamma_o$ is the resistance of the non-crosslinked polymer.

The temperature TE at which the compound is incorporated into the polymer is defined as the temperature at which, after 10 minutes of pre-kneading, the polymer has reached the constant resistance to kneading corresponding to this temperature. This produces a homogeneous melt into which additives may be readily incorporated.

EXAMPLE 1

Fifty-five grams of a commercially available polyethylene ($d=0.958$, melt index: 22 g/10 min) were introduced into the kneader of the plastograph in accordance with the above description, at a TE of 180° C.

Test 1 : 1% of dicumyl peroxide was added to the melt. The resistance to kneading increased immediately. TS << TE.

Test 2: Under identical conditions, 1% of 2,3-dimethyl-2,3-diphenylbutane was added to the melt. After 30 minutes, no increase in the resistance to kneading was registered.

Test 3: Test 2 was repeated but 3% of the crosslinking agent was added. Still, no increase in the resistance to kneading was noted after 30 minutes.

Test 4: The same result was obtained as in Test 2 with the addition of 1% of 3,4-dimethyl-diphenylhexane.

Test 5: The same result was obtained as in Test 3 with the addition of 3% of 3,4-dimethyl-diphenylhexane.

Tests 1 to 5 show that compounds of the formula (I) permit a completely homogeneous incorporation of the compounds into the polymer melts without causing undesirable initiation of crosslinking, which is in contrast to the use of DCP.

EXAMPLE 2

Fifty-five grams of a commercially available polyethylene ($d = 0.960$, melt index: 20 g/10 min) were introduced into the kneader of the plastograph in accordance with the above description, at a TE of 215° C.

Test 1: An attempt to incorporate 1% of dicumyl peroxide caused difficulty, the resistance to kneading rising immediately. TS << TE.

Test 2: Under identical conditions, 1% of 2,3-dimethyl-2,3-diphenylbutane was added to the polymer and the mixture was kneaded for 30 minutes. No increase in the resistance to kneading was observed.

Test 3: Identical results as observed in Test 2 were obtained with the addition of 1% of 3,4-dimethyl-3,4-diphenylhexane.

EXAMPLE 3

Fifty-five grams of the same polyethylene as used in Example 2 were introduced into the kneader at a TE of 280° C.

Test 1: 1% of 2,3-dimethyl-2,3-diphenylbutane was added to the melt and a constant increase in the resistance to kneading was observed. After 30 minutes, F = 2.10. TS < TE.

Test 2: Test 1 was repeated but the compound used was 3,4-dimethyl-3,4-diphenylhexane. Again, the resistance to kneading increased constantly and, after 30 minutes, F = 2.2. TS < TE.

What is claimed is:

1. A method of crosslinking a polyolefine in the presence of a crosslinking agent having the formula

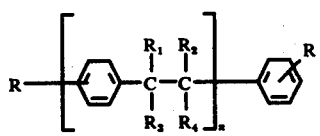

wherein each R is selected from the group consisting of hydrogen, an alkyl group having from 1 to 6 C-atoms and an alkoxy group having 1 or 2 C-atoms, and $R_1$, $R_2$, $R_3$ and $R_4$ each is selected from the group consisting of hydrogen and an alkyl group having from 1 to 6 C-atoms, at least two of $R_1$, $R_2$, $R_3$ and $R_4$ being an alkyl group, and $n$ is an integer from 1 to 5.

2. The method of claim 1, wherein $R_1$, $R_2$, $R_3$, and $R_4$ are alkyl groups.

3. The method of claim 2, wherein the alkyl groups are methyl or ethyl groups.

4. The method of claim 1, wherein the polyolefine is polyethylene.

5. The method of claim 1, wherein the polyolefine is a copolymer of ethylene and propylene.

6. The method of claim 1, wherein the polyolefine is cross-linked at a temperature from 170° to 400° C.

7. The method of claim 1, wherein the polyolefine is crosslinked in the presence of 0.1 to 5%, by weight, based on the polyolefine, of the crosslinking agent.

8. A method as set forth in claim 6, wherein said polyolefine is intimately mixed prior to said crosslinking with said crosslinking agent at a temperature above the softening point of said polyolefine, but not exceeding 190° C, said polyolefine consisting essentially of repeating units having not more than four carbon atoms.

9. A method as set forth in claim 8, wherein the intimately mixed polyolefine and crosslinking agent are held at said 170° to 400° for a period of 10 hours to 6 minutes, the amount of said cross linking agent and said period being sufficient to cause a significant increase in the resistance of said mixture to kneading.

10. A method as set forth in claim 8, wherein the amount of said cross linking agent is sufficient to cause a significant increase in the resistance of said mixture to kneading within 30 minutes at 280° C, $n$ being one or two.

* * * * *